United States Patent [19]
Rousseau et al.

[11] Patent Number: 5,893,955
[45] Date of Patent: Apr. 13, 1999

[54] PROCESS FOR THE PRODUCTION OF A PANEL OF THE HONEYCOMB TYPE AND CARBON/CARBON OR CARBON/CERAMIC COMPOSITE

[75] Inventors: Gérard Rousseau, Saint Aubin De Medoc; Jean Christophe Pasquet, Bordeaux, both of France

[73] Assignee: Aerospatiale Societe Nationale Industrielle, Paris Cedex, France

[21] Appl. No.: 08/820,527

[22] Filed: Mar. 19, 1997

[30] Foreign Application Priority Data

Mar. 19, 1996 [FR] France ............... 96 03650

[51] Int. Cl.$^6$ .......................... B32B 31/26
[52] U.S. Cl. .............. 156/89.22; 156/89.26; 156/292; 156/307.3; 156/307.7
[58] Field of Search ............... 156/89.22, 155, 156/307.3, 307.7, 89.26, 292; 428/178, 188

[56] References Cited

U.S. PATENT DOCUMENTS

| | | |
|---|---|---|
| 3,174,895 | 3/1965 | Gibson et al. . |
| 4,617,072 | 10/1986 | Merz . |
| 4,824,711 | 4/1989 | Cagliostro et al. . |
| 5,150,507 | 9/1992 | Goela et al. . |
| 5,360,500 | 11/1994 | Evans et al. . |
| 5,490,892 | 2/1996 | Castagnos et al. ........... 156/89.22 |
| 5,547,737 | 8/1996 | Evans et al. ................ 428/178 |
| 5,632,834 | 5/1997 | Ostertag et al. ............. 156/89.22 |

FOREIGN PATENT DOCUMENTS

| | | |
|---|---|---|
| 0 051 535 | 5/1982 | European Pat. Off. . |
| 0 477 505 | 4/1992 | European Pat. Off. . |
| 0 611 741 | 8/1994 | European Pat. Off. . |
| 2 197 618 | 5/1988 | United Kingdom . |

*Primary Examiner*—Curtis Mayes
*Attorney, Agent, or Firm*—Young & Thompson

[57] ABSTRACT

A process for the production of a panel, of the honeycomb support type clad on opposite sides with a skin of carbon/carbon or carbon/ceramic composite. A honeycomb support is produced by pyrolysis of a carbon cloth pre-impregnated with a thermosetting resin. Skins are produced from carbon cloth pre-impregnated with a thermosetting resin. The support and the skins are assembled with a carbon cloth pre-impregnated with a thermosetting resin between them. The assembly is polymerized and then pyrolyzed. Finally, a chemical infiltration in vapor phase is carried out for densification and reinforcement of the bonding of the assembly. Used in the production of structures requiring very high dimensional stability, such as those used in outer space.

11 Claims, 1 Drawing Sheet

PROCESS FOR THE PRODUCTION OF A PANEL OF THE HONEYCOMB TYPE AND CARBON/CARBON OR CARBON/CERAMIC COMPOSITE

FIELD OF THE INVENTION

The present invention relates to thermostructural composite materials and more particularly to structures formed by a sandwich panel of the honeycomb type of composite carbon/carbon or carbon/ceramic material.

The invention concerns more particularly, but not exclusively, the production of structures adapted for spatial applications and which must satisfy a certain number of severe requirements such as high rigidity, very great dimensional stability and lightness, absence of differential expansion.

Moreover, certain uses, particularly optical, require an environment as clean as possible requiring a material which does not outgas when it is subjected to a vacuum in space.

BACKGROUND OF THE INVENTION

Ordinary techniques for production of panels of the honeycomb type of composite carbon/resin material are not adapted to provide structures satisfying the severe conditions mentioned above.

Thus, according to one of these techniques, there are produced two skins constituted for example of several layers of carbon fiber cloth pre-impregnated with an epoxy resin, the skins are disposed on opposite sides of a honeycomb, for example of carbon cloth impregnated with epoxy resin, with the interposition of an adhesive resin film, then the assembly is subjected to polymerization ensuring both hardening of the matrix of the skins and the cementing of these latter to the honeycomb core.

Moreover, the low temperature resistance (150° C.) of such a panel, the presence of the resin, simply polymerized or cross-linked, is liable, because of its ability to take up moisture, to give rise to deformation of the panel and also release gaseous components into the environment.

Moreover, such a resin does not age well and the resistance of the structure thus formed decreases with time.

In short, structures produced from such panels are not satisfactory when ultra-stable structures are needed, and are not polluting from an optical standpoint.

SUMMARY OF THE INVENTION

The present invention provides particularly a technique for production of a thermostructural composite material of the honeycomb type, all carbon or carbon/ceramic, adapted to satisfy the very severe requirements imposed for the production of ultra-stable structures adapted for spatial applications.

To this end, the invention has for its object a process for production of a honeycomb panel of carbon/carbon or carbon/ceramic composite, comprising a support of honeycomb or the like constituted by a reinforcement of carbon fibers densified by a carbon or ceramic matrix, flanked on opposite sides by a skin constituted by a reinforcement of carbon fibers densified by a matrix of carbon or ceramic, characterized in that it consists:

- in providing, on the one hand, the honeycomb support, by pyrolysis of a honeycomb structure of carbon cloth pre-impregnated with a thermosetting resin,
- in providing, on the other hand, the or each skin, by covering with carbon cloths pre-impregnated with a thermosetting resin,
- in assembling the support and the skin or skins, by interposing between the skin and the support a carbon cloth pre-impregnated with a thermosetting resin,
- in polymerizing whilst compacting the assembly thus obtained,
- then in pyrolyzing said assembly,
- and, finally, by effecting a chemical infiltration in vapor phase for densification and reinforcement of the cementing of the assembly.

According to a preferred embodiment, the honeycomb support cells are formed from a cloth whose warp and weft are oriented at 45° to the axis of the cells, the impregnating resin being a phenolic or polyimide resin.

The skin or skins is or are, preferably, formed by a stack of layers crossed at 45° with mirror symmetry.

Preferably, the carbon cloth interposed between the skin and the support to ensure cementing is impregnated with the same resin as the honeycomb support but with a higher degree of impregnation, said cloth being applied to the skin before emplacement of this latter on said support.

The two operations of pyrolysis, on the one hand of the honeycomb support, and, on the other hand, of the assembled sandwich, take place under usual conditions, for example at a temperature of the order of 900° C.

The polymerization of the resins of the assembled sandwich also takes place under usual conditions, at a temperature slightly below 200° C. and preferably by placing the sandwich under vacuum with the application of external pressure.

Finally, the chemical infiltration in vapor phase also takes place in a known manner, for example, to obtain an all-carbon assembly, with methane, at about 1,000° C., under a pressure of $10^3$ Pa and for about ten days.

The panel thus obtained constitutes an "all-carbon" structure having remarkable qualities of rigidity, lightness, dimensional stability.

From such a sandwich, there can be constructed particularly structures adapted for spatial applications, such as collars or cylindrical support structures or the like, which can have large dimensions, for example a spaced telescope structure for which, among other things, the greatest dimensional stability and an unpolluted optical environment are major requirements.

According to a modification permitting obtaining a composite carbon/ceramic structure and more particularly a structure with a matrix of silicon carbide SiC, the infiltration in vapor phase is carried out with a suitable precursor, such as trichloromethylsilane, so as to obtain a SiC matrix in the honeycomb support and in the skins.

BRIEF DESCRIPTION OF THE DRAWINGS

Other characteristics and advantages will become apparent from the description which follows, of an embodiment of the process of the invention, which description is given solely by way of example and with respect to the accompanying figures, in which.

DETAILED DESCRIPTION OF THE INVENTION

Figure 1:
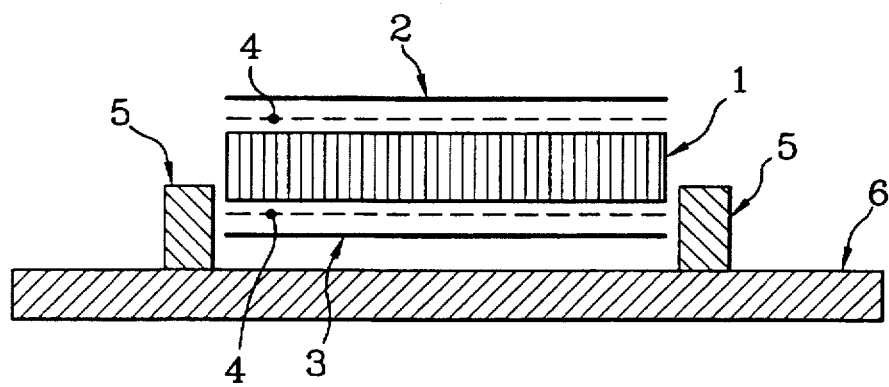
FIG. 1 is a diagram illustrating the assembly phase of a sandwich according to the invention.

In FIG. 1, there is shown schematically, in exploded cross-sectional view, a rectangular section comprising a core 1 of honeycomb, and at 2 and 3 respectively an upper skin and a lower skin, at 4 a pre-impregnated cloth interposed between each skin 2, 3 and the central core 1. At 5 are shown lateral stops, disposed on the four sides of the sandwich, the assembly being supported by a metallic plate 6 covered with an impervious Teflon cloth.

The honeycomb 1 is for example one of those sold by the HEXCEL company, constituted by a carbon cloth rigidified by thermosetting resins such as phenolic, polyimide, furan or polycyanate resins.

A very suitable cloth is with taffeta reinforcement stabilized by strands of 1,000 filaments of the material called "Thornel 300", the warp and weft of this cloth being disposed at 45° to the axis of the cells or recesses of the honeycomb.

These cells have walls of which half is constituted by a layer of a single uncompressed cloth.

The specific gravity of the honeycomb, which depends on the weight of the cloth used for its fabrication and on the size of the cells, varies between about 0.032 g/cm$^3$ and about 0.32 g/cm$^3$.

The honeycomb 1 is, independently of the skins, pyrolyzed in known manner, for example at a temperature of about 900° C.

After pyrolysis, it is noted that the core 1, already porous from the outset because of the thin walls of its cells, has even more porosity because of the retraction of the polymer during pyrolysis from the strands, the purpose of this porosity being explained later.

The skins 2 and 3 are formed by separate application before being cemented to the honeycomb 1.

For this purpose, there is used for each skin, four superposed layers of a carbon cloth pre-impregnated with a phenolic resin for example, the warps of two consecutive layers being crossed at 45° whilst maintaining mirror symmetry, which permits obtaining skins which do not deform during the operations of polymerization and pyrolysis.

The assembly of the elements of the sandwich is then carried out as shown in FIG. 1.

It is to be noted in this connection that the preliminary step of pyrolysis of the core 1 alone, will not be carried out if a core 1 is available that is already pyrolyzed.

A cladding of cement is interposed between each skin 2, 3 and the core 1, and is constituted preferably by a carbon cloth 4 pre-impregnated with a phenolic resin, applied on one of the surfaces of the skins before these latter are brought into contact against the core 1.

The cloth 4 is for example of the same type as that used for the skins 2, 3, but preferably with a degree of impregnation with resin substantially greater than that of the resin of said skins.

Figure 2:
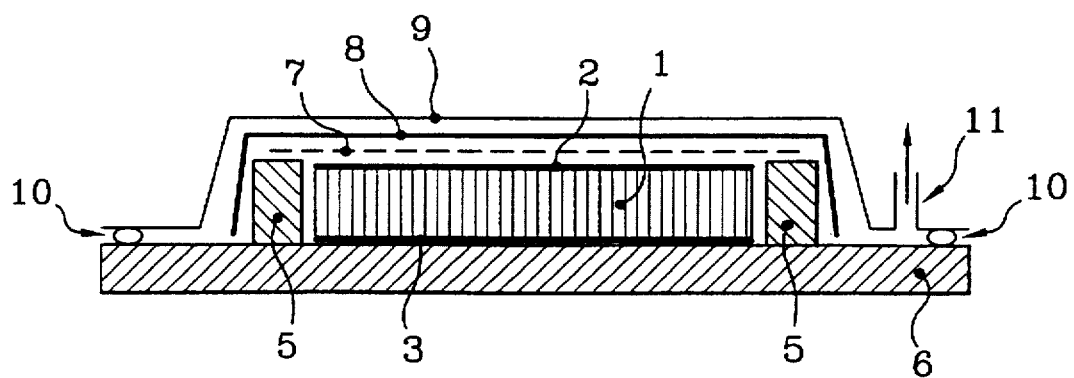
FIG. 2 shows the vacuum compaction of the sandwich during is polymerization.

The skins 2, 3 thus provided with their cloth 4 are then placed into contact with the core 1 (FIG. 2). The peripheral stops 5 are emplaced, the assembly 1 to 4 is covered in known manner with a porous cloth 7, with a drainage cloth 8 and finally with a bladder 9, sealed by a mastic at 10 at its periphery and provided with a valve 11 connecting it to a source of vacuum (not shown).

The assembly of FIG. 2 is then placed in an autoclave for polymerization therein of the resin of the skins 2, 3 and of the cloths 4, under usual temperature conditions (lower than 200° C.).

The pressure exerted on the sandwich results both from the vacuum within the bladder 9 and from external pressure applied in the autoclave for example of the order of 1 to 2 bars relative to the exterior of the autoclave.

Micrographic examination of the core-skin juncture shows that the edge of the walls of the honeycomb 1 greatly compresses the cementing cloth 4, which is distorted between these walls in the direction of the center of the honeycomb. In alignment with each line of contact between the cloth 4 and the end of the walls of the honeycomb, said cloth 4 embraces over several tenths of a millimeter the walls on each side, which increases the cementing surface by a phenomenon analogous to the formation of a meniscus of cement rising along the walls of the honeycomb in conventional cementing with the aid of an adhesive film.

After polymerization, the sandwich, stripped of its bladder 9, is replaced in the autoclave and subjected to pyrolysis of the resins of the skins 2, 3 and of the cloths 4, in a known manner, for example in an inert gas at 900° C.

This pyrolysis transforms the phenolic resin into vitreous carbon and is accompanied by a large shrinking of the matrix giving rise to a supplemental porosity for example of the order of 255 for a volumetric amount of the fiber of the composite of the order of 60%.

The shrinkage of the matrix being prevented by the fibers, said matrix develops microfissures without however giving rise to deformation of the composite and hence without disturbing the relative positions of the skins 2, 3 and the core 1 which remain cemented to each other.

Finally, to consolidate the cementing and densification of the sandwich, there is carried out in a vacuum oven a chemical infiltration in vapor phase, under usual conditions, for example with the aid of methane as a precursor, at a temperature of the order of 1,000° C., under a pressure of $10^3$ Pa and for a period of 250 hours.

Such an infiltration seals particularly the microfissures and the microporosities of the skins (2 to 4) and of the honeycomb core and substantially consolidates the regions of the junctions between the core 1 and the cloths 4.

The highly porous character of the sandwich of course promotes such an infiltration, which takes place to a depth and in a manner which is quite homogeneous.

It is to be noted that such a densification does not substantially reduce the microporosity of the core 1, whilst it does not eliminate all porosity of the skins 2, 3, such that the final panel thus obtained retains a certain porosity.

This panel is remarkable among other ways by the quasi-isotropic character of its overall arrangement, resulting both from a quasi-isotropic arrangement of the skins in their plane and a quasi-isotropic comportment of the core 1 perpendicular to the skins.

By way of example, there has been produced according to the invention, a sandwich of 3.7 cm thickness, constituted of a honeycomb core 1 of a density of 0.064 with cells of 4.8 mm and skins 2, 3 each formed of four layers of a satin reinforcing cloth of 4 and a weight of 215 g/m$^2$. The skins have a thickness of 0.8 mm with a fiber volume of 59%, a porosity after pyrolysis of 26% and a coke volume of 15%.

The weight increase of this sandwich during vapor phase infiltration shows that the volume occupied by the pyrocarbon in the honeycomb is 1.6 times greater than the volume freed by pyrolysis of the resin and accordingly the presence of the skins does not substantially impede the densification of the honeycomb nor the consolidation of the adhesive junction. The final density of the sandwich has been established to be 0.2.

Mechanical tests for tearing off the skins have resulted in tearing off at the skin/core boundary under a pressure of 1.75

MPa, which, considered for the cemented surface (contact surface of skin and core), which is to say the edge of the honeycomb, gives a force of about 20 MPa. This mechanical strength is altogether comparable to carbon/resin sandwiches of comparable construction.

The remarkable dimensional stability and mechanical strength properties result particularly, and according to the process of the invention, from the conjunction of the assembly of steps of pyrolysis in two stages, namely that of the core 1, then that of the assembly of core+skin+cementing cloths, from polymerization with compacting before the second stage of pyrolysis and by final densification by chemical infiltration in vapor phase. It is thus to be noted that if a single pyrolysis treatment were carried out, on said assembly, from a central core which itself was not pyrolyzed, there would be produced in the sandwich deformations as well as insufficient cementing of the skins, resulting from the lateral shrinkage which the central core would be subject to in the course of this single pyrolysis step. Such shrinkage renders fragile the cement by giving rise to rupture of the cement which can lead to delamination of the skins.

The fact of pyrolyzing the central core before assembly of the sandwich rigidifies the core, and the subsequent operations of polymerization, pyrolysis and infiltration can only reinforce the rigidity and the dimensional stability of the assembly, which is very much greater than that of a carbon/resin composite.

Thus, as shown above, the presence of the resin gives rise, because of its aptitude to taking up humidity, to risks, particularly in the environment of space, of the evaporation of water present in the resin, which is adapted to give rise to deformations of the structure. On the contrary, an all-carbon structure according to the invention is totally free from such risks.

The invention also has for its object any wall structure produced with the aid of such a sandwich, particularly structures adapted for space applications requiring both considerable lightness, high rigidity, and an excellent dimensional stability.

It is to be noted that such structures in a space environment are not going to pollute the environment by outgassing of occluded gases, which would be the case with a structure of the type of carbon/resin composite material, again by the fact of the aptitude of the resin to take up humidity. Releasing to the exterior solid particles would be a major drawback in certain applications such as support structures for space telescopes for scientific observation.

It should also be emphasized that the porosity of the structure according to the invention permits interior/exterior gas exchange in certain applications.

For applications in high temperature environments, there could be provided structures resisting oxidation by densifying by silicon carbide the different elements of the sandwich by chemical infiltration in vapor phase with the aid of a suitable precursor, for example trichloromethylsilane, so as to clad the carbon fibers and to seal the microfissures of said matrices with silicon carbide SiC.

The invention is of course not limited to the production of structures adapted for spatial or aeronautical uses.

What is claimed is:

1. A process for the production of a honeycomb panel which is a carbon/carbon or carbon/ceramic composite, comprising a honeycomb (1) constituted by a reinforcement of carbon fibers densified by a matrix of carbon or ceramic, clad on at least one side with a skin (2, 3) constituted of a reinforcement of carbon fibers densified by a carbon or ceramic matrix, the process comprising the steps of:
   producing a honeycomb support (1) by pyrolysis of a honeycomb structure of carbon cloth pre-impregnated with a thermosetting resin,
   producing at least one said skin (2, 3) from carbon cloth pre-impregnated with a thermosetting resin,
   assembling the support (1) and said at least one skin (2, 3) with a cloth (4) of carbon pre-impregnated with a thermosetting resin disposed between the skins and the support,
   polymerizing whilst compressing the assembly thus obtained,
   pyrolyzing said assembly, and
   carrying out a chemical infiltration in vapor phase of said assembly for densification and reinforcement of the bonding together of the assembly.

2. A process according to claim 1, wherein said honeycomb (1) has cells formed from a cloth whose warp and weft are oriented at 45° to the length of the cells.

3. A process according to claim 1, wherein said at least one skin (2, 3) is formed from a stack of layers crossed at 45° with mirror symmetry.

4. A process according to claim 1, wherein the carbon cloth (4) interposed between said at least one skin (2, 3) and the support (1) is impregnated with the same resin as the honeycomb (1) but with a higher degree of impregnation than the degree of impregnation of resin of the honeycomb.

5. A process according to claim 1, wherein said carbon cloth (4) is applied by pressing on said at least one skin (2, 3) before emplacing the skin on the support (1).

6. A process according to claim 1, wherein the impregnation resin of the carbon fibers of the support (1), of said at least one skin (2, 3) and of the carbon cloth (4) is selected from the group consisting of phenolic resin, polyimide resin, furan resin and polycyanate resin.

7. A process according to claim 1, wherein the operations of pyrolysis of the honeycomb support (1) and of the assembled sandwich are carried out at a temperature of about 900° C.

8. A process according to claim 1, wherein the polymerization of the resins of the assembled sandwich takes place at a temperature less than 200° C. and by placing the assembly under external pressure.

9. A process according to claim 1, wherein said chemical infiltration in vapor phase is effected with methane at about 1,000° C. under a pressure of $10^3$ Pa for about ten days.

10. A process according to claim 1, wherein said chemical infiltration in vapor phase is carried out with trichloromethylsilane as a precursor thereby to cause an infiltration with silicon carbide.

11. A process according to claim 1, there being a said skin (2, 3) on each side of said honeycomb (1).

* * * * *